US012586452B2

(12) United States Patent
Diaz et al.

(10) Patent No.: US 12,586,452 B2
(45) Date of Patent: Mar. 24, 2026

(54) SHAKER

(71) Applicant: PSS BELGIUM NV, Dendermonde (BE)

(72) Inventors: Edgard Diaz, Dendermonde (BE); Giuseppe Di Carlantonio, Dendermonde (BE); David Corynen, Dendermonde (BE)

(73) Assignee: PSS BELGIUM NV, Dendermonde (BE)

( * ) Notice: Subject to any disclaimer, the term of this patent is extended or adjusted under 35 U.S.C. 154(b) by 157 days.

(21) Appl. No.: 18/572,900

(22) PCT Filed: May 31, 2022

(86) PCT No.: PCT/EP2022/064746
§ 371 (c)(1),
(2) Date: Dec. 21, 2023

(87) PCT Pub. No.: WO2022/268451
PCT Pub. Date: Dec. 29, 2022

(65) Prior Publication Data
US 2024/0312321 A1     Sep. 19, 2024

(30) Foreign Application Priority Data
Jun. 22, 2021     (GB) ..................................... 2108925

(51) Int. Cl.
*G08B 6/00*          (2006.01)
*B60N 2/90*          (2018.01)
(Continued)

(52) U.S. Cl.
CPC ................. *G08B 6/00* (2013.01); *B60N 2/90* (2018.02); *H02K 33/18* (2013.01); *H04R 9/025* (2013.01);
(Continued)

(58) Field of Classification Search
CPC ... G08B 6/00; G08B 7/00; B60N 2/90; H02K 33/18; H04R 9/025; H04R 9/045;
(Continued)

(56) References Cited

U.S. PATENT DOCUMENTS 4,354,067 A  * 10/1982  Yamada ................. H04R 9/047
                                                          381/301
4,675,907 A     6/1987  Itagaki
(Continued)

FOREIGN PATENT DOCUMENTS

WO          2020126847 A1     6/2020

OTHER PUBLICATIONS

ISA/EPO; International Search Report and Written Opinion for corresponding International Patent Application No. PCT/EP2022/064746 mailed Sep. 27, 2022, 14 pages.

*Primary Examiner* — Sinh Tran
(74) *Attorney, Agent, or Firm* — NK Patent Law

(57)                    ABSTRACT
A shaker for transmitting vibrations to an application has a frame; magnet unit that provides a magnetic field in a gap; coil assembly including a voice coil mounted to a former. The former is attached to the frame at a former attachment surface and configured to position the coil in the gap, when the shaker is at rest. The magnet unit moves relative to the coil along an axis when the shaker is activated by supplying current to the coil. The magnet unit is suspended from the frame by a suspension arrangement including proximal and distal suspensions which interconnect the frame and magnet unit. The proximal suspension is closer to the former attachment surface than the distal suspension when the shaker is at rest. One of the proximal and distal suspensions has a stiffness $K_1$, and the other $K_2$, wherein $K_2 > K_1$, and the ratio $K_1/K_2$ is 0.4 or less.

20 Claims, 18 Drawing Sheets

(51) Int. Cl.

| | |
|---|---|
| *H02K 33/18* | (2006.01) |
| *H04R 9/02* | (2006.01) |
| *H04R 9/04* | (2006.01) |
| *H04R 9/06* | (2006.01) |
| *G08B 7/00* | (2006.01) |

(52) U.S. Cl.
CPC ............. *H04R 9/045* (2013.01); *H04R 9/066* (2013.01); *G08B 7/00* (2013.01); *H04R 2400/11* (2013.01); *H04R 2499/13* (2013.01)

(58) Field of Classification Search
CPC ........................... H04R 9/066; H04R 2400/11; H04R 2499/13; H04R 5/023; H04R 2440/05; B06B 1/045
See application file for complete search history.

(56) References Cited

U.S. PATENT DOCUMENTS

| | | | | |
|---|---|---|---|---|
| 6,377,145 | B1 | 4/2002 | Kumagai | |
| 7,006,641 | B1 | 2/2006 | Saiki | |
| 7,372,968 | B2 | 5/2008 | Buos | |
| 2003/0227225 | A1* | 12/2003 | Kaneda | H02K 33/18 |
| | | | | 310/81 |
| 2007/0182257 | A1 | 8/2007 | Miura | |
| 2017/0289695 | A1 | 10/2017 | Bongiovi | |
| 2022/0386034 | A1* | 12/2022 | Yang | H04R 9/043 |

* cited by examiner

| Test | Textile/Textile | | Dominant metal/Textile | |
|---|---|---|---|---|
| | $F_s$ (Hz) | % change | $F_s$ (Hz) | % change |
| Start | 70 | 0 | 53 | 0 |
| 1 hour aging | 57 | -19 | 50 | -6 |
| Damp heat cycle with frost | 54 | -23 | 48 | -9 |
| Mechanical shock | 46 | -34 | 48 | -9 |
| Vibration at 80°C | 40 | -43 | 47 | -11 |

SHAKER

CROSS-REFERENCE TO RELATED APPLICATIONS

This application is a U.S. National Phase Application of International Patent Application No. PCT/EP2022/064746, filed on 31 May 2022, which claims priority to GB2108925.5 filed 22 Jun. 2021.

This application claims priority to GB2108925.5, filed 22 Jun. 2021.

FIELD OF THE INVENTION

The present invention relates to a shaker for transmitting vibrations to an application.

BACKGROUND

Shakers, for transmitting vibrations to an application, are known. Such devices are sometimes known as electrodynamical shakers or electromechanical shakers.

A shaker, if attached to a car seat (e.g. via a frame of the car seat, via foam of the car seat, or via other coupling features of the car seat), can be used for transmitting vibrations to a person sat in the car seat.

Such vibrations can be used to provide a tactile warning to a person sat in the seat, to provide a massage to a person sat in the seat, and/or to enhance a listening experience to a person sat in the seat (e.g. by helping them "feel" bass sounds more strongly).

Shakers which use two suspensions for providing stability against rocking motion are known, see e.g. U.S. Pat. No. 4,354,067 (Yamada), U.S. Pat. No. 4,675,907 (Itagaki).

Shakers which use just one (metal) suspension are also known, see e.g. U.S. Pat. No. 6,377,145B1 (Kumagai) and U.S. Pat. No. 7,372,968B2 (Buos). In Buos, it is proposed to configure the single suspension to act in a plane generally passing through the centre of mass of a magnet unit, to reduce rocking motion.

However, as discussed below in more detail, the present inventors have found that existing shaker designs which have two suspensions can be difficult and expensive to manufacture. Although these issues become less of a problem if only one metal suspension is used in a shaker, the present inventors have found shakers which include only one metal suspension are vulnerable to rocking motion, even if the single suspension is mounted as described in Buos.

The present invention has been devised in light of the above considerations.

SUMMARY OF THE INVENTION

In a first aspect, the present invention may provide: A shaker for transmitting vibrations to an application, the shaker having:

a frame, including an application attachment surface for attaching the shaker to the application;

a magnet unit configured to provide a magnetic field in an air gap;

a coil assembly including a voice coil mounted to a voice coil former, wherein the voice coil former is attached to the frame at a voice coil former attachment surface on the frame, wherein the voice coil former is configured to position the voice coil in the air gap, when the shaker is at rest;

wherein the magnet unit is configured to move relative to the voice coil along a movement axis of the shaker when the shaker is activated by supplying electrical current to the voice coil;

wherein the magnet unit is suspended from the frame by a suspension arrangement that includes a proximal suspension which interconnects the frame and the magnet unit and a distal suspension which interconnects the frame and the magnet unit, wherein the proximal suspension is closer to the voice coil former attachment surface on the frame than the distal suspension when the shaker is at rest;

wherein one of the proximal and distal suspensions has a stiffness $K_1$, and the other of the proximal and distal suspensions has a stiffness $K_2$, wherein $K_2 > K_1$, and the ratio $K_1/K_2$ is 0.4 or less.

The present inventors have found that the use of two suspensions, at different locations along the movement axis, helps reduce rocking motion compared with the use of a single suspension. As there are two suspensions, there is no need to mount a suspension to act in a plane generally passing through the centre of mass of a magnet unit to reduce rocking motion (unlike Buos, described in the background section, above).

Moreover, by having one suspension (having stiffness $K_2$) which is dominant in providing stiffness to the suspension arrangement compared with the less stiff suspension (having stiffness $K_1$), it is possible for the dominant suspension to provide durability to the suspension arrangement, whilst the less stiff suspension is able to provide stability against rocking motion at lower cost than were two equally stiff suspensions used.

The shaker may be considered to be at rest when electrical current is not supplied to the voice coil.

The application may be any object or apparatus to which the shaker can be attached via the application attachment surface on the frame. In some examples, the application may be a car seat.

Stiffness is a well-understood parameter of a suspension, and may be measured by applying a controlled incremental and decremental force to the suspension element and measuring the displacement for any force applied. Techniques for measuring stiffness are well-known. In the context of the present invention, stiffness may be measured in relation to displacement of the magnet unit from its rest position (the position in which the magnet unit is at when the shaker is at rest) since as shown in FIG. 5, stiffness increases with displacement from a rest position. Similarly, resonant frequency $F_s$ may be measured/calculated based on the magnet unit being in its rest position.

The stiffness $K_1$ may be 0.1 N/mm or higher, more preferably 0.2 N/mm or higher, more preferably 0.4 N/mm or higher.

The stiffness $K_1$ may be 20 N/mm or lower, more preferably 10 N/mm or lower.

In some examples, $K_1$ may be in the range 0.4 N/mm to 10 N/mm.

The stiffness $K_2$ may be 1 N/mm or higher, more preferably 2 N/mm or higher.

The stiffness $K_2$ may be 100 N/mm or lower, more preferably 50 N/mm or lower.

In some examples, $K_1$ may be in the range 2 N/mm to 50 N/mm.

$F_s$ may be 30 Hz or higher, more preferably 40 Hz or higher.

$F_s$ may be 200 Hz or lower, more preferably 100 Hz or lower, more preferably 70 Hz or lower.

In some examples, $F_s$ may be in the range 30 Hz to 200 Hz, e.g. in the range 30 Hz to 70 Hz.

Preferably, the suspension that has the stiffness $K_2$ is a metal suspension, i.e. it is made of metal. A metal suspension can, by giving it a suitable geometry, be made to dominate the overall stiffness of the suspension arrangement, particularly when the suspension that has the stiffness $K_1$ is formed of an inexpensive material, such as a textile (e.g. a thin, polycotton sheet).

The metal suspension may be formed of sheet metal. The thickness of the sheet metal may be 1 mm or less.

The metal suspension may have one or more cutouts formed therein, to facilitate suitable behaviour. The one or more cutouts may have a spiral shape.

The suspension that has the stiffness $K_2$ is preferably annular, and positioned such that the suspension that has the stiffness $K_2$ extends circumferentially around the magnet unit.

Accordingly, the suspension that has the stiffness $K_2$ may include one or more (preferably more than one, preferably at least three) attachment tabs on an outer periphery thereof, wherein the one or more attachment tabs facilitate a mechanical attachment of the distal suspension to the frame. More preferably, the frame includes one or more slots, the/each slot corresponding to a respective attachment tab on an outer periphery of the suspension that has the stiffness $K_2$, wherein the one or more attachment tabs facilitate a mechanical attachment of the distal suspension to the frame via a bayonet fitting in which the attachment tabs engage with a respective slot in the frame. This helps facilitate accurate alignment of the suspension that has the stiffness $K_2$, when attaching this suspension to the frame.

Preferably, the suspension that has the stiffness $K_1$ is a textile suspension, i.e. it is made of a textile.

Preferably, the textile suspension includes corrugations, since this can help to stiffen a textile suspension.

Of course, a skilled person will appreciate that stiffness of each suspension is partly dictated by the material of the suspension, the geometry of the suspension, and the attachment between the suspension and the frame.

The suspension that has the stiffness $K_1$ may be rotationally symmetric. It may be configured to be used either way around. The suspension that has the stiffness $K_1$ may be symmetric in other ways.

The suspension that has the stiffness $K_1$ is preferably annular, and positioned such that the suspension that has the stiffness $K_1$ extends circumferentially around the magnet unit. If the suspension that has the stiffness $K_1$ is a textile suspension that includes corrugations, the corrugations preferably extend circumferentially around the magnet unit.

The present inventors have found that the combination of using a metal suspension (as the suspension having stiffness $K_2$) and a textile suspension (as the suspension having stiffness $K_1$) is particularly advantageous in providing the beneficial effects noted above, as this combination is able to provide a shaker that is stable against rocking motion and easy to manufacture, The ratio $K_1/K_2$ may be 0.35 or less. The ratio $K_1/K_2$ may be 0.3 or less, or even 0.25 or less. The lower the ratio $K_1/K_2$, the more dominant the suspension that has the stiffness $K_2$ is in providing stiffness to the suspension arrangement.

The proximal suspension may have the stiffness $K_1$, and the distal suspension may have the stiffness $K_2$. This can be helpful for ease of manufacturing in forming the shaker from its constituent parts, particularly when the frame includes a main frame and a subframe (see below). Moreover, the distal suspension is the suspension that can be exposed if protection is missing, and thus it is an advantage to have the stiffer suspension (which is more likely to be durable, and may e.g. be made of metal-see above) to be exposed, rather than the less stiff suspension (which may be made of a soft textile material, which could get damaged more easily). But it is possible instead for the proximal suspension to have the stiffness $K_2$ and the distal suspension to have the stiffness $K_1$.

The magnet unit may include a U-yoke, having a U shape when viewed in cross section, wherein the U-yoke has a base end corresponding to the base of the U shape, and an open end corresponding to the open end of the U shape. Preferably, the U-yoke is mounted in the shaker with the base end of the U-yoke further from the voice coil attachment surface than the open end of the U-yoke.

Preferably, the U-yoke includes an open end attachment surface at the open end of the U-yoke, wherein an inner periphery of the proximal suspension which interconnects the frame and the magnet unit is attached to the magnet unit at the open end attachment surface of the magnet unit.

The U-yoke may include a shoulder at its open end to provide the open-end attachment surface. The shoulder may take the form of an annular indentation formed in the open end of the U-yoke.

Preferably, the U-yoke includes a base end attachment surface at the base end of the U-yoke, wherein an inner periphery of the distal suspension which interconnects the frame and the magnet unit is attached to the magnet unit at the base end attachment surface of the magnet unit.

The U-yoke may include a shoulder at its base end to provide the base end attachment surface. The shoulder may take the form of an annular indentation formed in the base end of the U-yoke.

The shaker may be divided into a proximal side and a distal side by a mid-plane which is perpendicular to the movement axis and which passes through the voice coil when the shaker is at rest, wherein the proximal side of the shaker is on the side of the mid-plane that includes the voice coil former attachment surface, and wherein the distal side of the shaker is on the other side of the mid-plane from the distal side.

For avoidance of any doubt, the mid-plane could be at any location along the movement axis, as long as it passes through the voice coil and is not located at the ends of the shaker.

Preferably, the proximal suspension is located on the proximal side of the shaker, and the distal suspension is located on the distal side of the shaker. This helps inhibit rocking motion during use of the shaker. The base end attachment surface of the U-yoke may be located on the distal side of the shaker and the open end attachment surface of the U-yoke may be located on the proximal side of the shaker. However, other arrangements are possible.

The application attachment surface may be on the proximal side of the mid-plane or on the distal side of the mid-plane, or indeed may lie on the mid-plane, since the application attachment surface will in general vary depending on the application.

The frame may include a main frame and a subframe which are attached together, wherein the main frame includes the application attachment surface.

The main frame may include at least one distal suspension attachment surface for attaching the distal suspension thereto. The at least one distal suspension attachment surface may be provided by one or more slots in the main frame, the/each slot corresponding to a respective attachment tab on an outer periphery of the distal suspension, wherein the one or more attachment tabs facilitate a mechanical attachment of the distal suspension to the main frame via a bayonet fitting in which the attachment tabs engage with a respective slot in the frame, when attaching this suspension to the frame. In this arrangement, the distal suspension preferably has the stiffness $K_2$.

The subframe may include the voice coil former attachment surface.

The main frame and/or subframe may include at least one proximal suspension attachment surface for attaching an outer periphery of the proximal suspension thereto. In some embodiments, both the main frame and subframe may each include at least one proximal suspension attachment surface for attaching an outer periphery the proximal suspension thereto, wherein the outer periphery of the proximal suspension is sandwiched between at least one proximal suspension attachment surface of the main frame and at least one proximal suspension attachment surface of the subframe.

A dustcap may be part of the subframe, e.g. the dustcap by be attached to another frame element to form the subframe. The dustcap may be configured to inhibit dust from entering a U-yoke of the magnet unit.

The voice coil may include at least two layers, preferably four layers (i.e. a wire forming the voice coil may be wrapped around the voice coil former such that it forms at least two layers of wire coil), since this can aid performance of the shaker.

The air gap may extend around the movement axis.

The frame (preferably the subframe) may include one or more channels, wherein each channel is for guiding a respective wire from the voice coil out of the shaker.

In a second aspect, the present invention may provide an apparatus including:

a shaker according to the first aspect;

an application, wherein the shaker is attached to the application via the application attachment surface.

The application may be a seat, e.g. a car seat. In examples, the shaker may be attached to the seat (e.g. car seat) via a frame of the car seat, via foam in the seat, or via a stiff panel in the seat, wherein the stiff panel may form a soundboard for the shaker.

The application may be an acoustic panel, configured to produce sound when the shaker is activated by supplying electrical current to the voice coil. As is well-known in the art, an acoustic panel would typically have a high stiffness, and would be suitably damped for the purpose of making sound when vibrated at an acoustic frequency.

In a third aspect, the present invention may provide a method of forming a shaker according to the first aspect.

In a preferred example, the method may include:

attaching a voice coil former to a subframe at a voice coil former attachment surface on the subframe, wherein a voice coil mounted to the voice coil former;

attaching an open end of a U-yoke of a magnet unit to an inner periphery of the proximal suspension, wherein the magnet unit is configured to provide a magnetic field in an air gap;

attaching an outer periphery of a proximal suspension to (e.g. at least one proximal attachment surface of) the subframe;

attaching a main frame to the subframe to form a frame (optionally whilst sandwiching the outer periphery of the proximal suspension between (e.g. at least one proximal attachment surface of) the main frame and (e.g. at least one proximal attachment surface of) the subframe);

attaching an outer periphery of a distal suspension to the main frame (optionally via a mechanical attachment, e.g. via a bayonet fitting as described above); and attaching a base end of the U-yoke of the magnet unit to an inner periphery of the distal suspension (e.g. via glue);

wherein one of the proximal and distal suspensions has a stiffness $K_1$, and the other of the proximal and distal suspensions has a stiffness $K_2$, wherein $K_2 > K_1$, and the ratio $K_1/K_2$ is 0.4 or less.

This method provides a particular easy route to manufacturing a shaker that is cheap to make, and stable against rocking motions, particularly when the distal suspension has the stiffness $K_2$ and the proximal suspension has the stiffness $K_1$, and even more so when a metal suspension is used as the distal suspension having the stiffness $K_2$ and a textile suspension is used as the proximal suspension having the stiffness $K_1$.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which:

FIG. 4 shows a table of values indicating a resonant frequency shift in a shaker with usage;

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

An example of a shaker 100 is illustrated in FIGS. 1A-1F.

FIGS. 1A-1F show, respectively, a cut-through view of the shaker 100, a perspective cut-through view of the shaker 100, a perspective view of the shaker 100, an exploded view of the shaker 100, a bottom-up view of the shaker 100 and

Figure 1A:
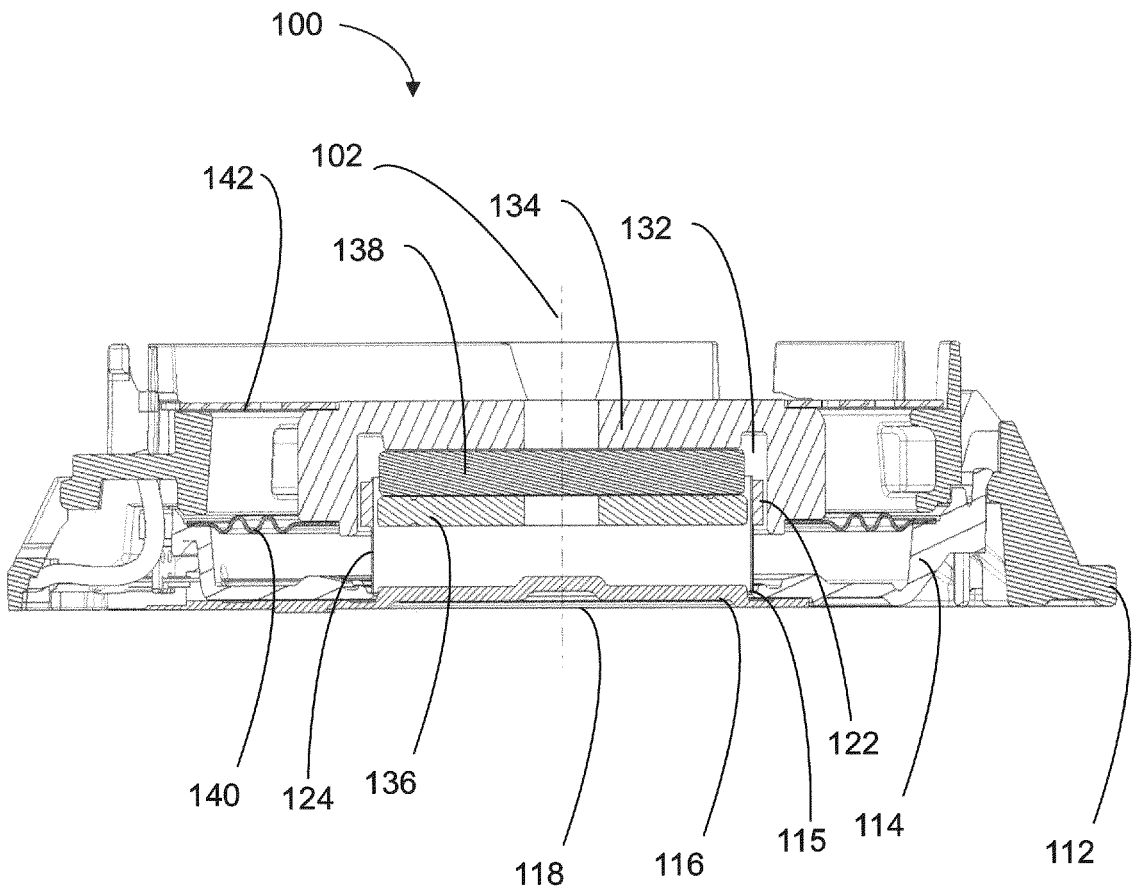
FIG. 1A shows a cut-through view of a shaker.
Figure 1B:
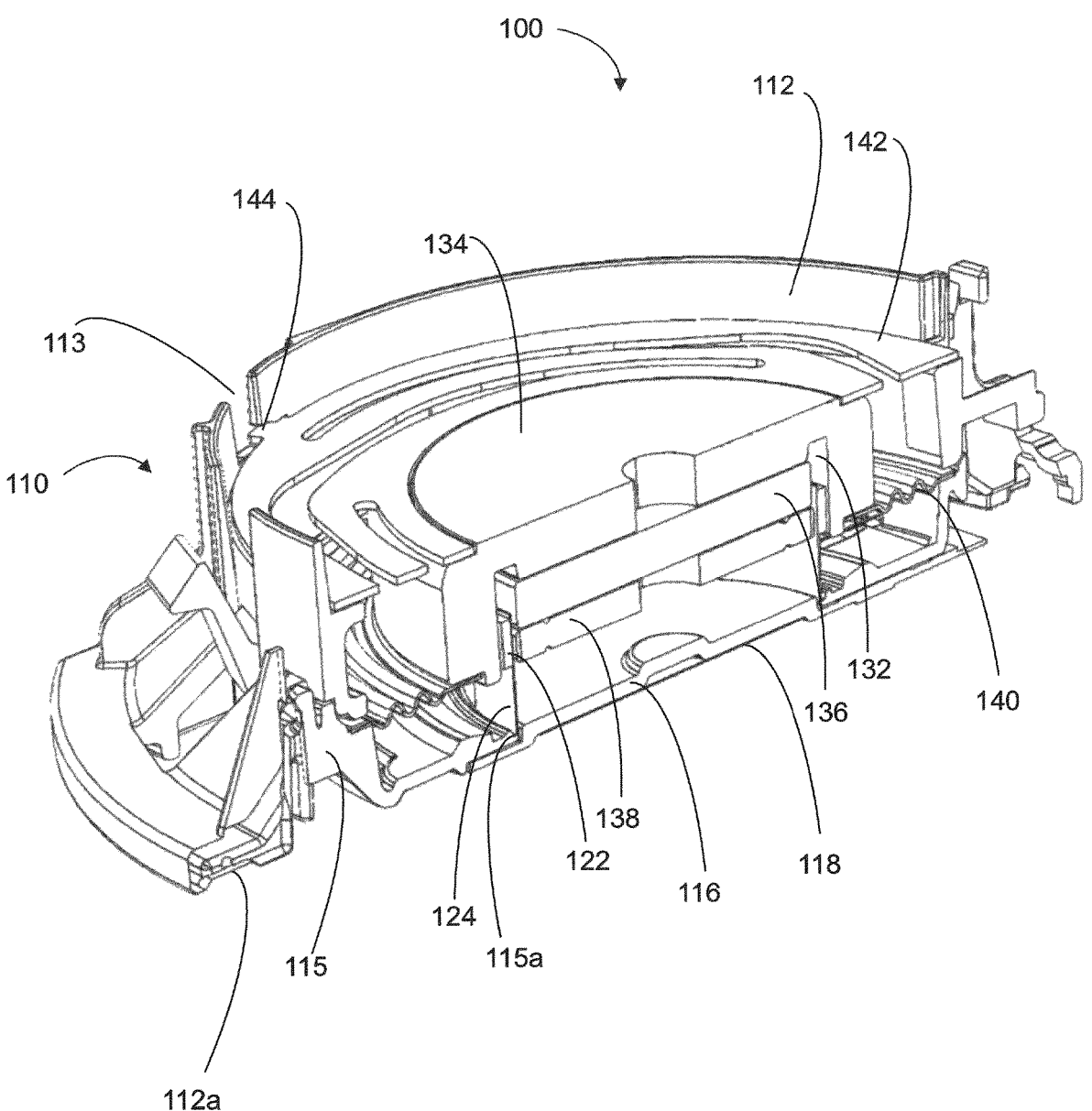
FIG. 1B shows a perspective cut-through view of a shaker.
Figure 1C:
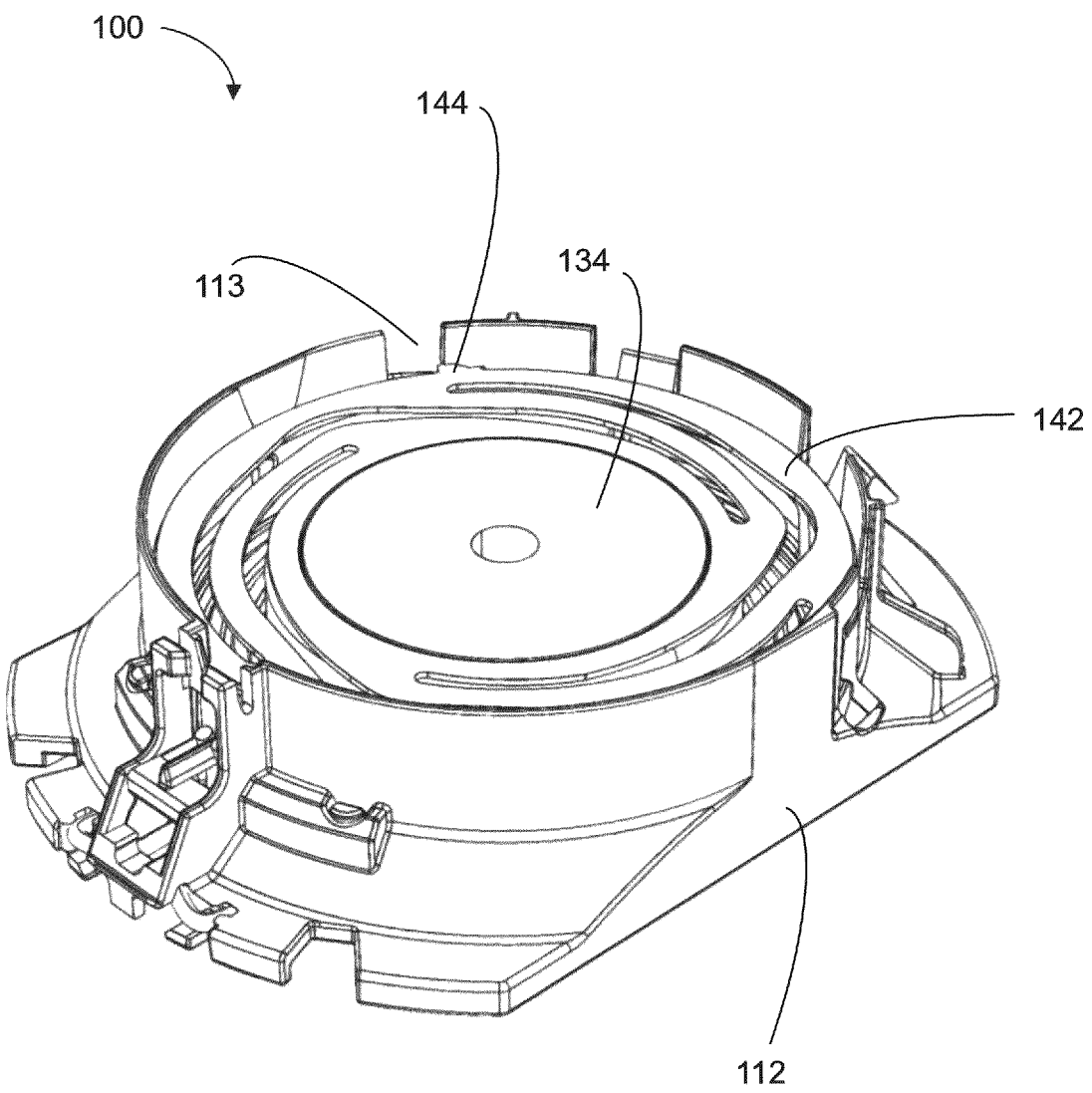
FIG. 1C shows a perspective view of a shaker.

7 a top-down view of the shaker 100 (bottom-up and top-down reference the orientation of the shaker 100 shown in FIGS. 1A-B, noting that the shaker 100 may in practice be mounted differently).

Figure 1D:
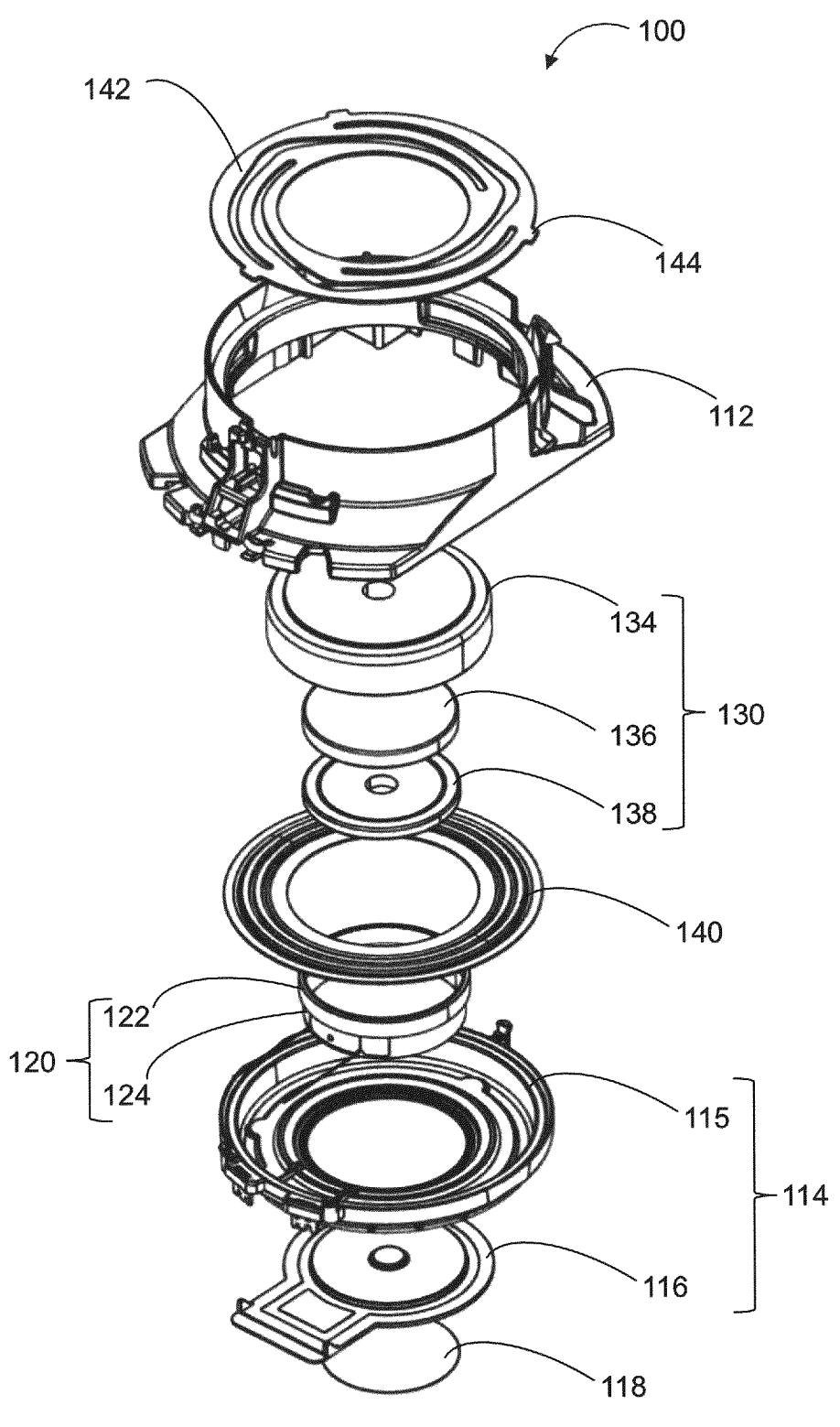
FIG. 1D shows an exploded view of a shaker.
Figure 1E:
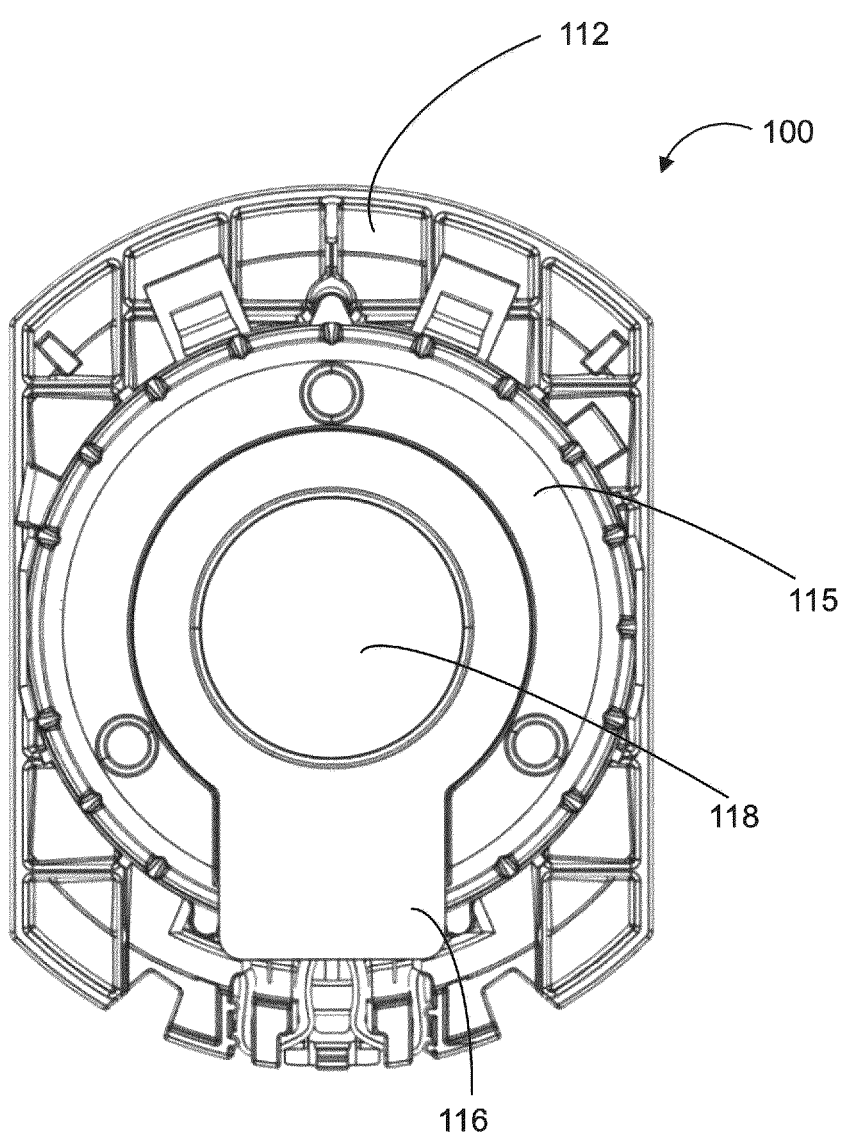
FIG. 1E shows a bottom-up view of a shaker.
Figure 1F:
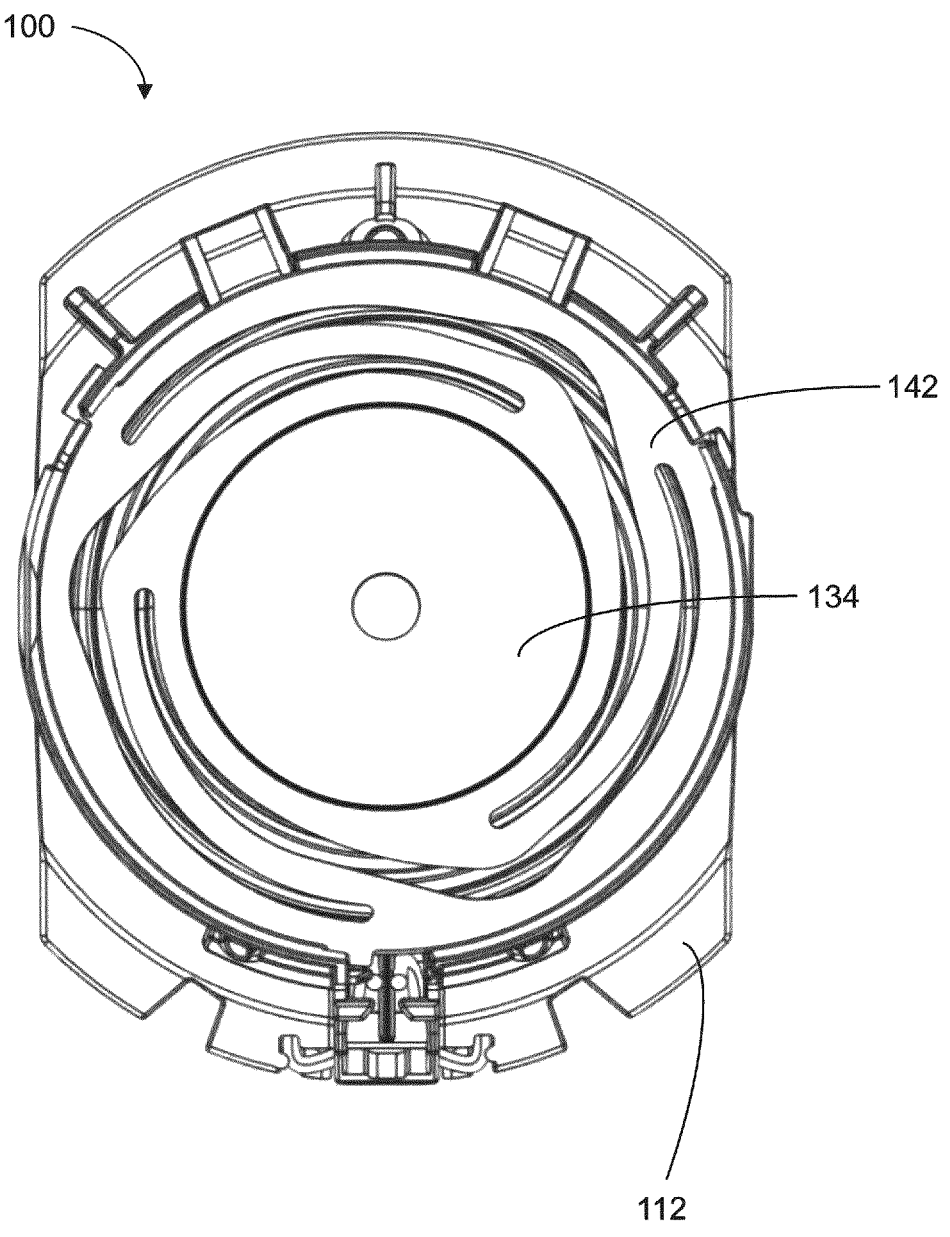
FIG. 1F shows a top-down view of a shaker.

As can be seen best in FIGS. 1A-B and 1D, the shaker 100 comprises a frame 110 formed from a main frame 112 and a subframe 114.

In this example, the subframe 114 is formed by a frame element 115 and a dustcap 116, with the dustcap 116 being attached to the frame element 115. In other examples, the frame element 115 and the dustcap may together be formed as an integral body, or the dustcap 116 may be omitted.

A coil assembly 120 comprising a voice coil 122 mounted to a voice coil former 124 is attached to the subframe 114 at a voice coil former attachment surface on the subframe 114. In this example, the voice coil former 124 is sandwiched between the frame element 115 and the dustcap 116, and so the voice coil former attachment surface 115a (at which the voice coil former 124 attaches to the subframe 114) may be provided by the frame element 115 and/or by the dustcap 116.

The voice coil former 124 is configured to position the voice coil 122 within an air gap 132 provided by a magnet unit 130 of the shaker 100 (see below). The main frame 112 and/or the subframe 114 may comprise an application attachment surface for attaching the shaker 100 to an application.

In this particular example, the application is the seat frame of an automotive seat, and the application attachment surface 112a is an annular surface provided by an annular projection on the main frame 112. Multiple application attachment surfaces may be provided.

The magnet unit 130 of the shaker 100 includes a U-yoke 134, a magnet 136 and a washer 138. The shape of the magnet unit 130 provides an annular air gap 132 in which the magnet unit 130 provides a magnetic field.

In use, electrical current is supplied to the voice coil 122 such that a magnetic field is generated by the voice coil 122 which interacts with the magnetic field provided by the magnet unit 130 (in the air gap) which causes the magnet unit 130 to move relative to the voice coil 122 along a movement axis 102 of the shaker 100. Of course, movement of the magnet unit 130 relative to the voice coil 122 along the movement axis 102 can also be considered movement of the voice coil 122 relative to the magnet unit 130.

The magnet unit 130 is suspended from the frame 110 via a suspension arrangement that includes a proximal suspension 140 which interconnects the main frame 112 and the magnet unit 130 and a distal suspension 142 which interconnects the main frame 112 and the magnet unit 130. The proximal suspension 140 is closer to the voice coil former attachment surface 115a than the distal suspension 142.

In this example, the proximal suspension 140 and the distal suspension are attached to the U-yoke 134 of the magnet unit 130. The U-yoke 134 has a U shape when viewed in cross-section, and comprises an annular proximal attachment surface for the proximal suspension 140 at the open end of the U-yoke 134, and an annular distal attachment surface for the distal suspension 142 at the base end of the U-yoke.

As can be seen best in FIG. 1B, the U-yoke 134 includes a shoulder at its open end to provide an open end attachment surface for the proximal suspension 140. This assists with gluing.

As can be seen best in FIG. 1B, the U-yoke 134 includes a shoulder at its base end to provide a base end attachment surface for the distal suspension 142. This assists with gluing.

In this example, the proximal suspension 140 is connected to the frame 110 by being sandwiched between and glued to the main frame 112 and the subframe 114.

In this example, the distal suspension 142 is connected to the main frame 112 by a bayonet fitting, with attachment tabs 144 of the distal suspension 142 engaging with slots 113 of the main frame 112. The attachment tabs 144 of the distal suspension 142 are glued to the slots 113 of the main frame 122 when fully engaged with the slots, so as to ensure attachment and also to add some damping.

The shaker 100 may be manufactured by:

attaching the voice coil former 124 to the subframe 114 at a voice coil former attachment surface on the subframe 114 (e.g. by gluing the voice coil former 124 to both the frame element 115 and the dustcap 116), wherein a voice coil 122 is mounted to the voice coil former 124;

attaching (the open end attachment surface at) the open end of the U-yoke 134 of the magnet unit 130 to the inner periphery of the proximal suspension 140;

attaching an outer periphery of the proximal suspension 140 to (the frame element 115 of) the subframe 114;

attaching the main frame 112 to (the frame element 115 of) the subframe 114 to form the frame 110, whilst sandwiching the outer periphery of the proximal suspension 140 between the main frame 112 and (the frame element 115 of) the subframe 114;

attaching an outer periphery of the distal suspension 142 to the main frame 112 (via the bayonet fitting described above); and attaching (the base end attachment surface at) the base end of the U-yoke 134 of the magnet unit 130 to an inner periphery of the distal suspension 142.

Since the distal suspension 142 is fitted via a bayonet fitting, the distal suspension 142 can be accurately aligned with the remaining components of the shaker 100, with respect to the movement axis 102 of the shaker 100, and indeed may serve to align the remaining components of the shaker by positioning the magnet unit 130 and proximal suspension 140 within the shaker 100.

The proximal suspension 140 and the distal suspension 142 are constructed to each have a different stiffness. In this example, the distal suspension 142 has a stiffness of $K_2$, and the proximal suspension 140 has a stiffness of $K_1$, with $K_1 < K_2$. The ratio $K_1/K_2$ may be, for example, 0.4 or less. Therefore, the majority of the stiffness of the suspension arrangement is, in this example, provided by the distal suspension 142. This may be achieved, for example, by forming the proximal suspension 140 from a textile and forming the distal suspension 142 from metal.

By way of example, $K_2$ may be from 3 N/mm (with e.g. $K_1=1$ N/mm, total stiffness $(K_1+K_2)=4$ N/mm, $K_1/K_2=0.25$ for resonant frequency $F_s=35$ Hz with 86 g moving mass) to 28 N/mm (with e.g. $K_1=10$ N/mm, total stiffness $(K_1+K_2)$ $=38$ N/mm, $K_1/K_2=0.35$, $F_s=100$ Hz with 86 g moving mass) calculated with a $K_1/K_2$ ratio of 0.2.

Figure 2:
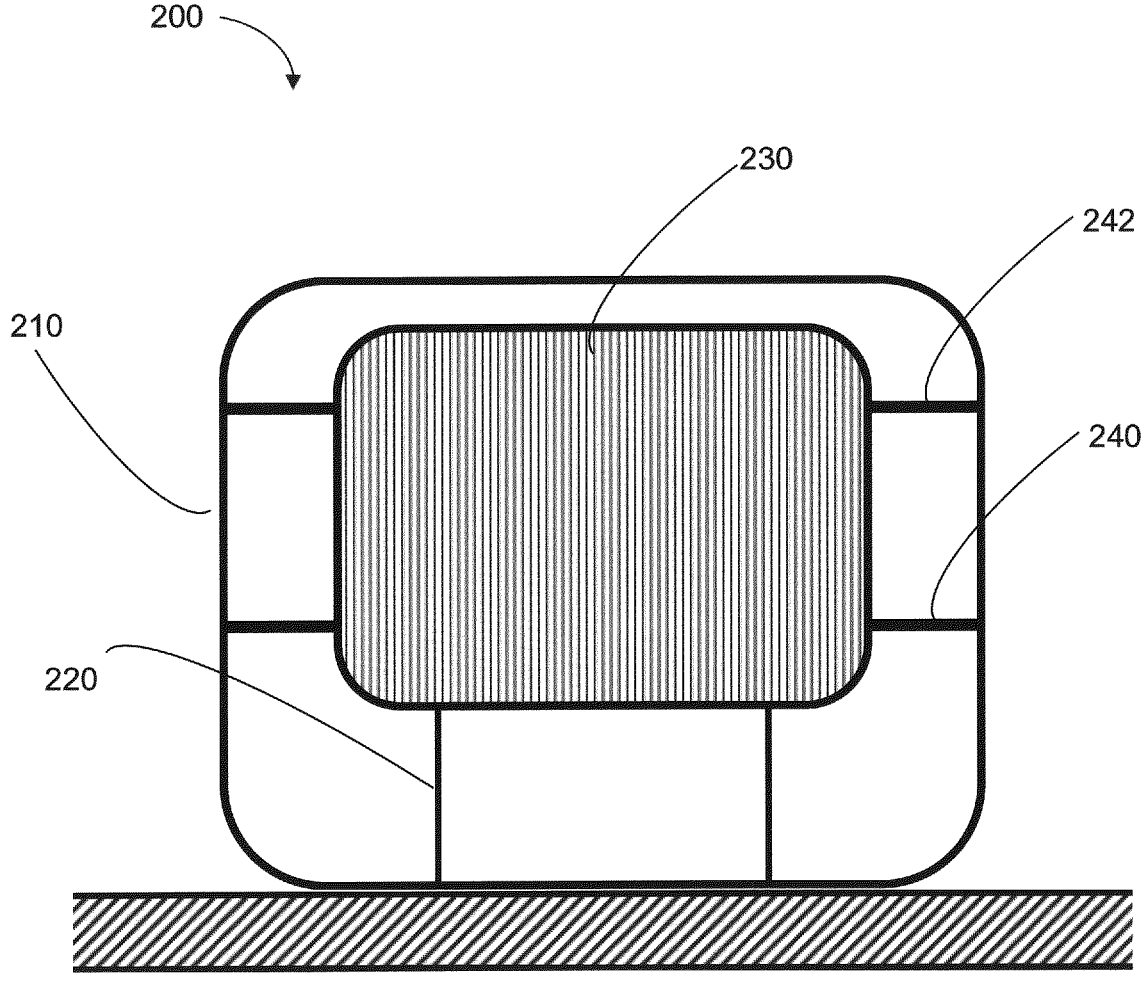
FIG. 2 shows a simplified model of a shaker.

A simplified model of a shaker 200, which can be used to understand the shaker 100 of FIG. 1, is illustrated in FIG. 2. Alike features have been given alike reference numerals throughout this disclosure.

The shaker 200 of FIG. 2 comprises a moving mass 230. The moving mass 230 has a mass of $M_m$. The moving mass 230 is suspended from a frame 210 by a proximal suspension 240 and a distal suspension 242, and is mounted about voice coil assembly 220. The proximal suspension 240 has a stiffness $K_1$, and the distal suspension 242 has a stiffness $K_2$. The combined stiffness of the suspension is $K_t=K_1+K_2$, and the resonant frequency of the system, $F_s$, can be calculated as $$F_s = \frac{1}{2\pi}\sqrt{\frac{K_t}{M_m}}$$

(with $F_s$ in units of Hz, $K_t$ in units of N/m and mass in units of kg). The stiffness of the proximal suspension 240 and the distal suspension 242 may change over time or through usage, and this can therefore affect the resonant frequency, $F_s$, of the system. Some materials are more susceptible to this change than others. For example, the stiffness of a suspension formed from textile may vary more over time than the stiffness of a suspension formed from metal.

Figure 3:
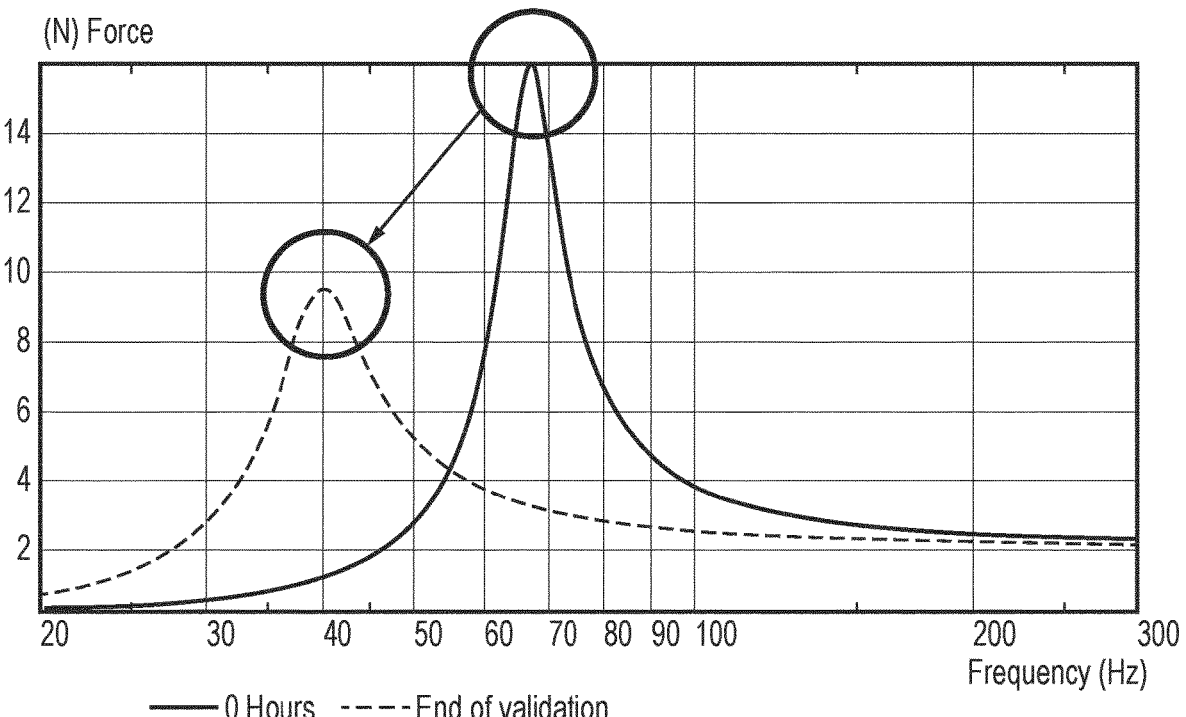
FIG. 3 shows results indicating a resonant frequency shift in a shaker with usage.

The results of an experiment to illustrate this change are illustrated in FIG. 3. The resonant frequency, $F_s$, for a mass wherein each of the proximal suspension 240 and the distal suspension 242 are formed of textile is measured both before and after an accelerated aging test. In this case, the resonant frequency, $F_s$, shifts from ~67 Hz to ~40 Hz, a >40% drop.

Use of a material that is less susceptible to change in stiffness can lessen or mitigate this shift. For example, the proximal suspension 240 and the distal suspension 242 may be formed from a material such as metal. Metal is a more durable material for forming a suspension. However, suspension formed of such materials metal causes a significant increase in cost for the apparatus. Therefore, whilst a shaker comprising metal proximal suspension 240 and metal proximal suspension 242 may offer higher durability, this is offset against increased material costs and increased manufacturing complexity.

The present inventors have realised that, since $F_s$ depends on the entire stiffness of the suspension (i.e. the sum of the stiffnesses of the individual components $K_t=K_1+K_2$), providing an arrangement with a dominant suspension (i.e. a suspension which contributes more than half of the total stiffness) formed of a more durable material and a secondary suspension (i.e. a suspension which contributes less than half of the total stiffness) formed of a less durable material can provide an improvement in durability with a reduced increase in manufacturing complexity or material cost, whilst still getting the improved stability against rocking motion obtained by having two suspensions. The improved durability is believed to be provided, at least in part, because the dominant suspension helps to protect the secondary suspension from aging, and also because the suspension helps to limit the impact of any aging in the secondary suspension (since a change in stiffness of the secondary suspension is a smaller proportion of the entire stiffness, and therefore the overall change is reduced).

For example, the stiffness $K_1$ of the secondary suspension may provide less than 29% of the total stiffness $K_t$ ($K_1/K_2$ is 0.4 or less), less than 26% of the total stiffness $K_t$ ($K_1/K_2$ is 0.35 or less), less than 23% of the total stiffness $K_t$ ($K_1/K_2$ is 0.3 or less), or less than 20% of the total stiffness $K_t$ ($K_1/K_2$ is 0.25 or less). The lower the ratio $K_1/K_2$, the more dominant the suspension that has the stiffness $K_2$ is in providing stiffness to the suspension arrangement, and therefore the less impact any change in stiffness $K_1$ has on the overall stiffness $K_t$.

Results from a comparative experiment are illustrated in FIG. 4. The table of values indicate the measured resonant frequency at certain intervals during the same accelerated aging test used to produce the results shown in FIG. 3 (note: the steps shown in the different rows are part of a single test). Such tests are well-known in the industry, though the details of the test used may vary from manufacturer to manufacturer.

In the dominant metal/textile setup, the metal suspension stiffness $K_2$ contributes 82% of the total suspension stiffness, while the textile suspension stiffness $K_1$ contributes 18% of the total suspension stiffness ($K_1/K_2=0.22$). It is clear that this arrangement provides a significant improvement in the durability of the unit. In particular, the shift in resonant frequency is reduced from a 40% reduction to an 11% reduction at completion of the aging test (see final row of FIG. 4), illustrating the technical improvement provided by the suspension arrangement.

Figure 5:
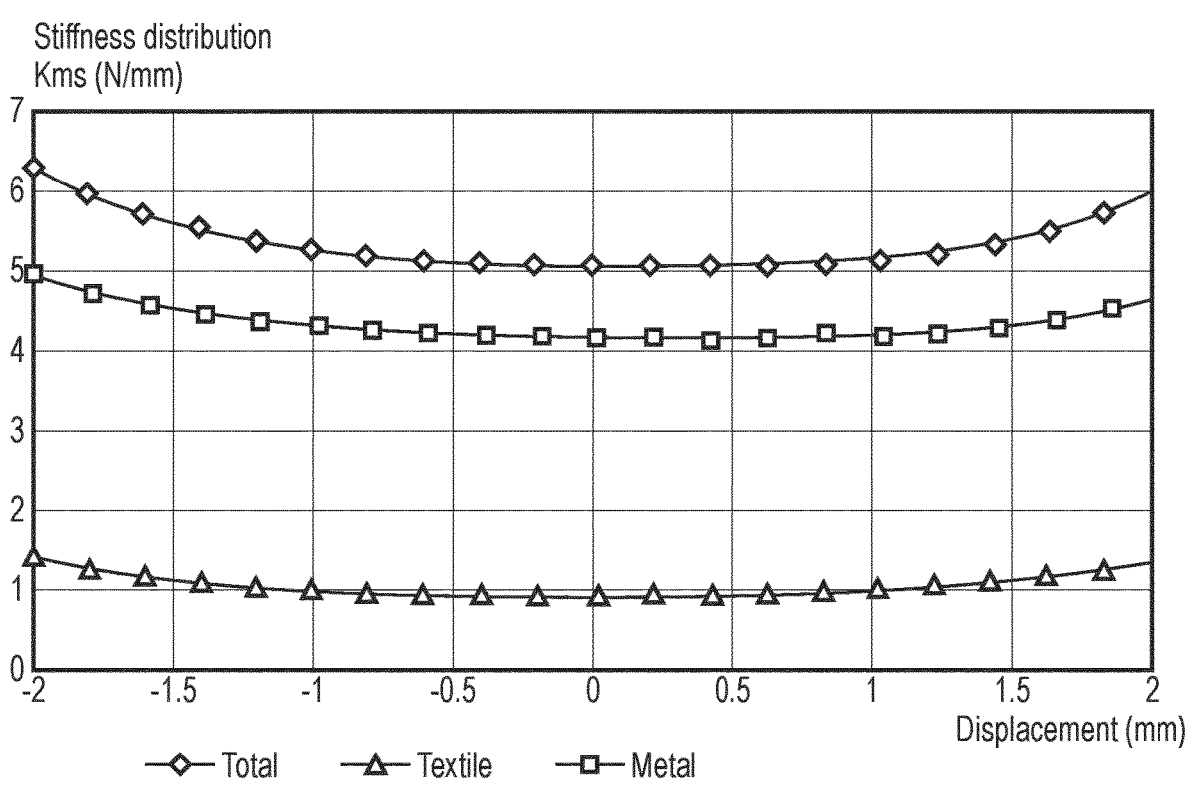
FIG. 5 shows a graph illustrating the variation in stiffness with displacement for the suspension elements.

A graphical representation of the stiffness distribution of the shaker 100 shown in FIG. 1 is illustrated in FIG. 5. In particular, FIG. 5 illustrates how the stiffness of the textile suspension 140 and metal suspension 142 vary with displacement from a rest position of each suspension. In each case, the stiffness of the suspension increases with increasing displacement, providing a strong restorative force to the rest position. As shown here, the stiffness increase with increasing displacement for each suspension is continuous and gradual, since the displacements are not so high as to break the suspensions. The combined stiffness of the two suspension elements fits the earlier stated relationship $K_t=K_1+K_2$, thereby validating this understanding of the contribution of the first and second suspension elements to the overall stiffness of the suspension.

In the context of the present invention, stiffness and resonant frequency $F_s$ may be measured in relation to the magnet unit being at its rest position (Displacement=0 mm, on FIG. 5).

The following description and associated FIGS. 6-10 provide further specific details of the implementation of a seat shaker 300, which implements essentially the same design as the seat shaker 100, to aid understanding of the present invention.

Figure 6:
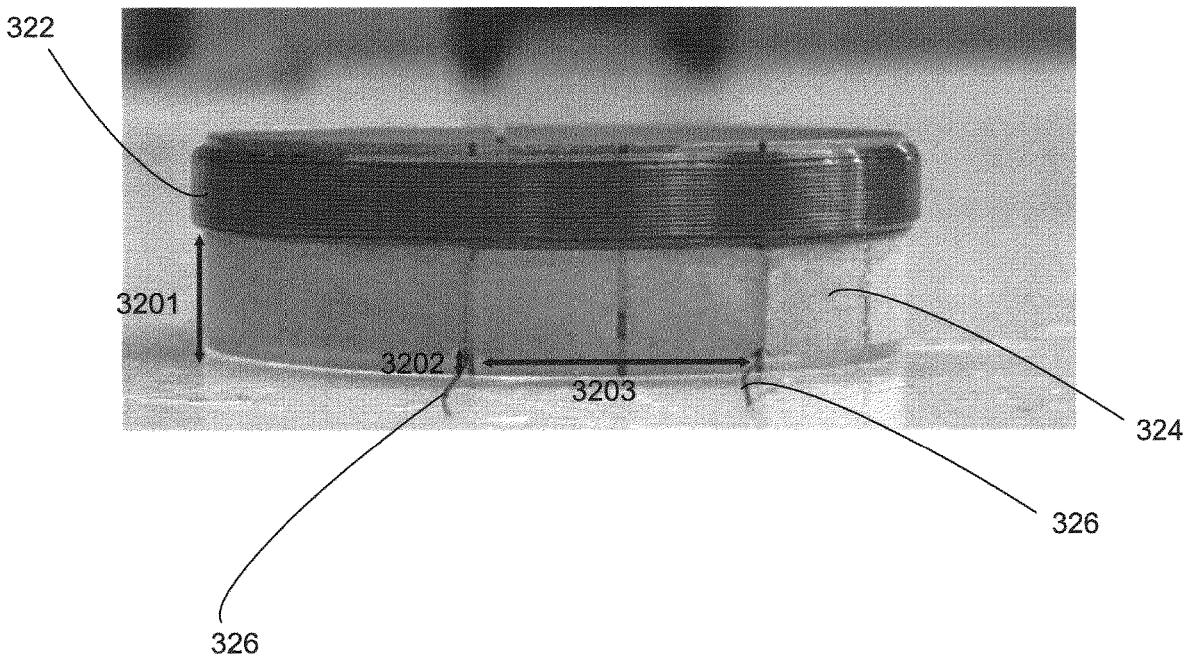
FIG. 6 shows a voice coil assembly.

FIG. 6 illustrates a voice coil assembly 320 comprising a voice coil 322 and a voice coil former 324. The voice coil 322 is formed as a 4-layer thick coil of wire about the voice coil former, and is terminated in two lead-out wires 326. Other configurations of the voice coil 322 may also be utilised, for example with a different number of layers, though at least three layers, preferably four layers, is believed to help optimise performance. The height of the voice coil 322 on the voice coil former (dimension 3201), the height of the exit point of lead-out wire 326 (dimension 3202) and the separation between the lead-out wires 326 (dimension 3203) can be varied as required for installation in a shaker.

Figure 7:
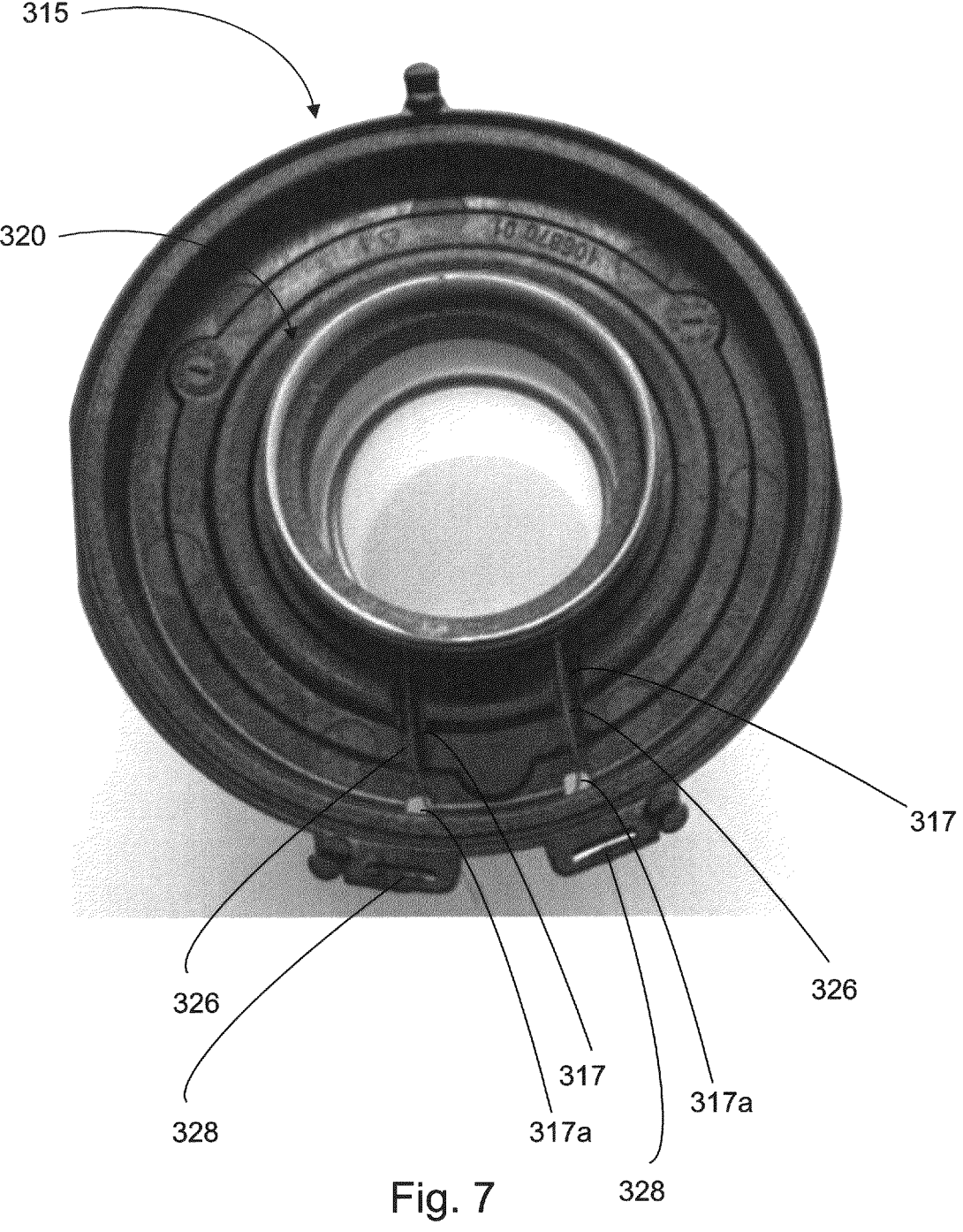
FIG. 7 shows a subframe.

FIG. 7 illustrates a frame element 315 of a subframe having a voice coil assembly 320 attached thereto. The frame element 315 includes channels 317 to guide the lead-out wires 326 of the voice-coil assembly 320 via holes 317a to connection tabs 328 (although connection tabs 328 can be seen in FIG. 7, the lead-out wires 326 connect to the connection tabs 328 on the opposite side of the frame element 315 from the side that is shown in FIG. 7). Said connection tabs 328 can be used to connect the voice coil assembly 320 to a source of electrical power, for example by soldering an electrical power source to the connection tabs 328. The use of channels 317 can reduce a requirement for tight manufacturing tolerance in the voice coil assembly 320, e.g. by making the channels 317 adequately wide. The use of channels 317 also helps guide the lead-out wires to the exit holes 317a to land properly on the connection tabs 328.

Figure 8A:
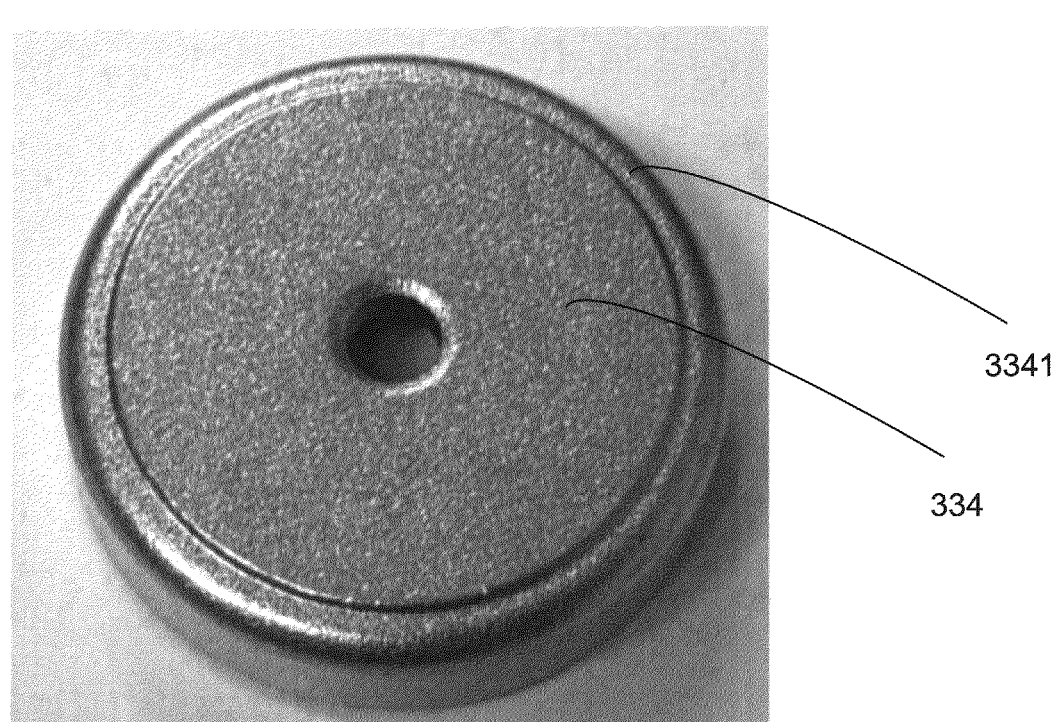
FIG. 8A shows a top-down view of a magnet unit.
Figure 8B:
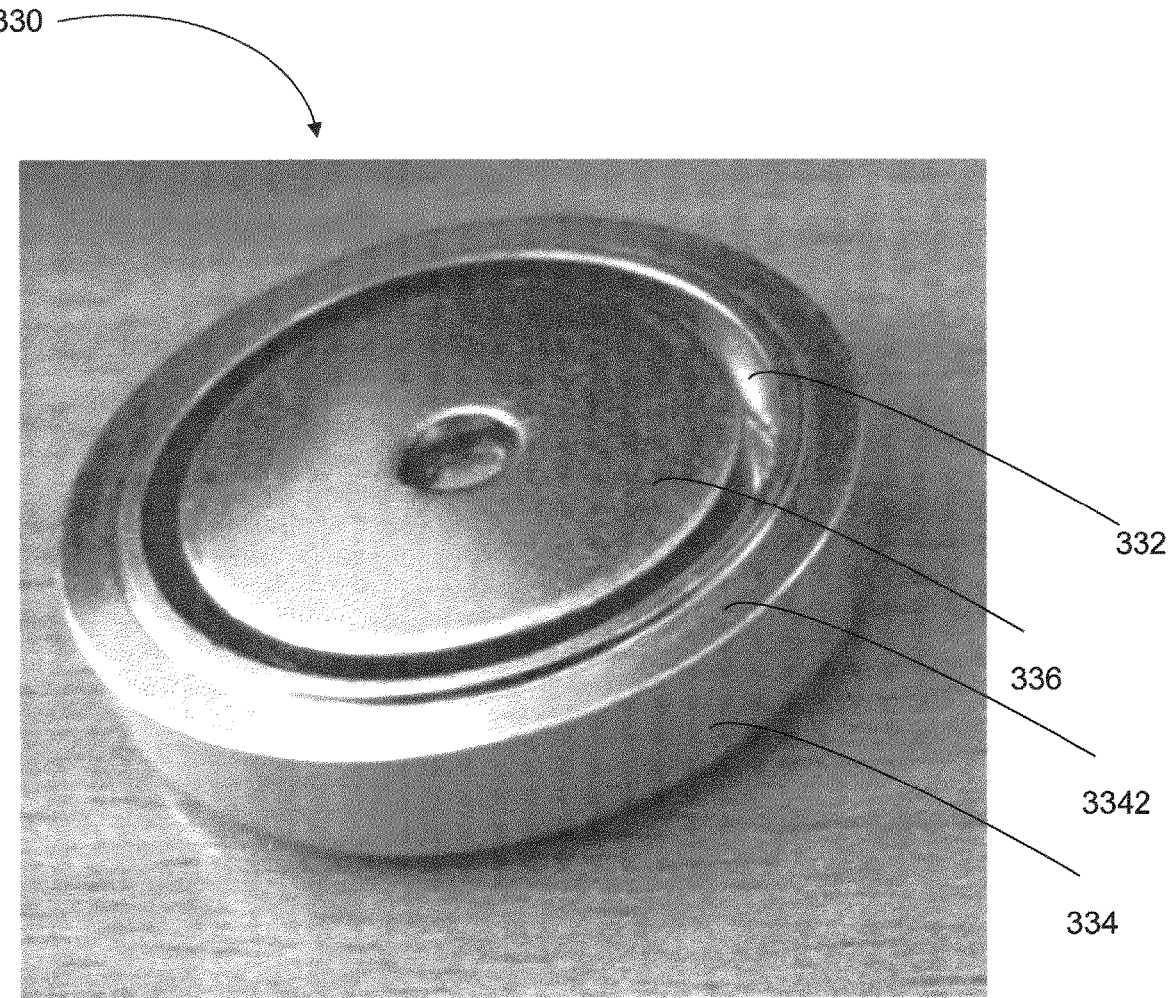
FIG. 8B shows a bottom-up view of a magnet unit.
Figure 8C:
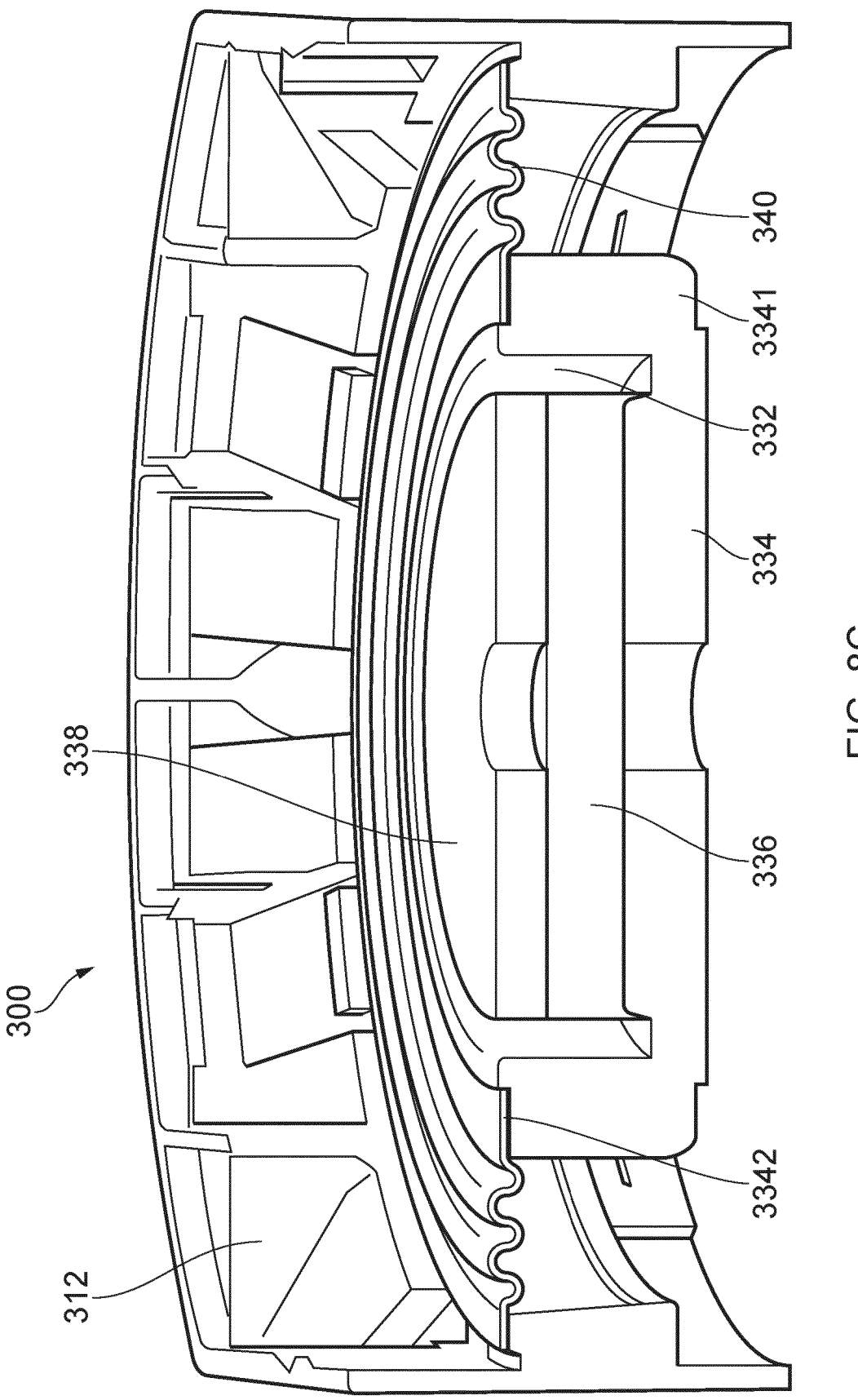
FIG. 8C shows a cut-through view of a magnet unit.

FIGS. 8A, 8B and 8C illustrate top, bottom and cut-through views of a magnet unit 330 for use in a shaker. FIG. 8A illustrates the magnet unit 330 as viewed from the base end of the U-yoke 334, while FIG. 8B illustrates the magnet unit 330 as viewed from the open end of the U-yoke 334 such that washer 338 and air gap 332 are visible. FIG. 8C shows a cut-through view of the magnet unit 330 mounted via a proximal suspension 340 to a frame 312. The shaker as illustrated in FIG. 8C is oriented upside down when compared to the illustrations of, e.g. FIG. 1 (in that the voice coil former attachment surface—not illustrated—would be located at the top of the image rather than at the bottom). Of the magnet unit 330, the U-yoke 334 provides much of the moving mass Mm of the magnet unit 330, and the mass of the U-yoke 334 can be varied by varying, for example, the wall thickness of the U-yoke 334. The magnet unit 330 further comprises a washer 338, a magnet 336 (not visible in FIGS. 8A-B), and provides a magnetic field in the air gap 332.

At the base end of the U-yoke 334, a shoulder provides a distal suspension attachment surface 3341 for attaching (by glue) a distal suspension 342 to the base end of the U-yoke 334.

At the open end of the U-yoke 334, another shoulder provides a proximal suspension attachment surface 3342 for attaching a proximal suspension 340 to the open end of the U-yoke 334.

The shoulders in the U-yoke help to facilitate attachment of the suspensions 340, 342 to the U-yoke, e.g. by helping to prevent or reduce glue from entering, for example, the air gap 332. The width of the shoulders can be varied to ensure optimal adhesion of the proximal and distal suspension. For example, if the width of the surface 3341 or the surface 3342 is too small, then attachment would be very difficult.

Figure 9:
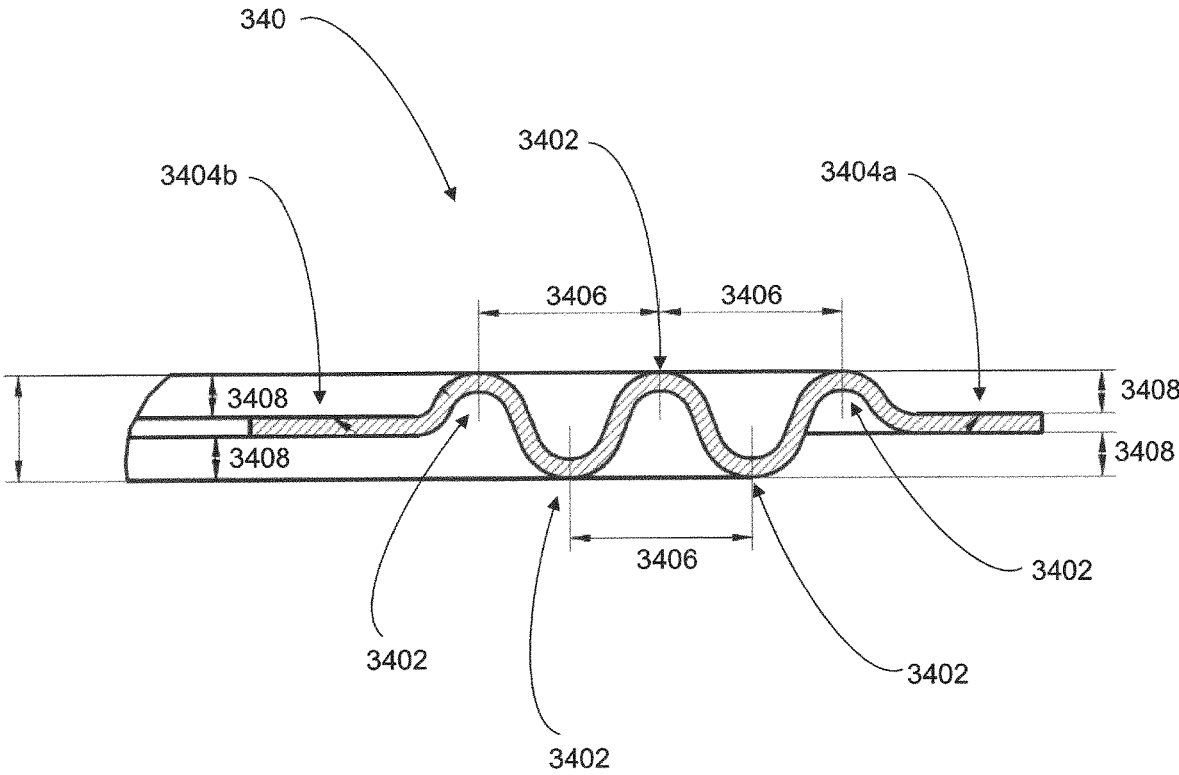
FIG. 9 shows a textile suspension.

FIG. 9 illustrates a portion of a textile suspension 340, which may form a proximal suspension in a shaker. The suspension includes a corrugated portion having corrugations 3402. The corrugations 3402 increase the stiffness of the textile suspension 340. The design of the textile suspension 340 is configured to allow the textile suspension 340 to be installed either way up in a shaker, by the gluing surfaces 3404a and 3404b lying on the same plane, and by having the same stiffness behaviour regardless of which way up the textile suspension 340 is mounted. This helps simplify the manufacturing of the shaker.

The gluing surfaces 3404a, 3404b for attaching the textile suspension to a frame and a magnet unit of a shaker are therefore located at a same level within the textile suspension. In other words, height dimension 3408 is the same for each of the top and bottom surfaces of the textile suspension 340, and each of the inner and outer surfaces of the textile suspension 340. Furthermore, the textile suspension 340 is configured to have symmetrical stiffness, such that the performance of the textile suspension 340 is not affected by its orientation in the shaker. Therefore, the corrugations 3402 are equally spaced, such that dimension 3406 is equal for each of the corrugations 3402. The length of the corrugations 3402 and the textile suspension 340 may be set such that the textile suspension 340 is not fully stretched during normal operation to prevent a non-linear change in stiffness and consequently less predictable operation, and also to prevent excessive stresses on the textile suspension 340 which could damage the textile suspension 340 over time.

Figure 10A:
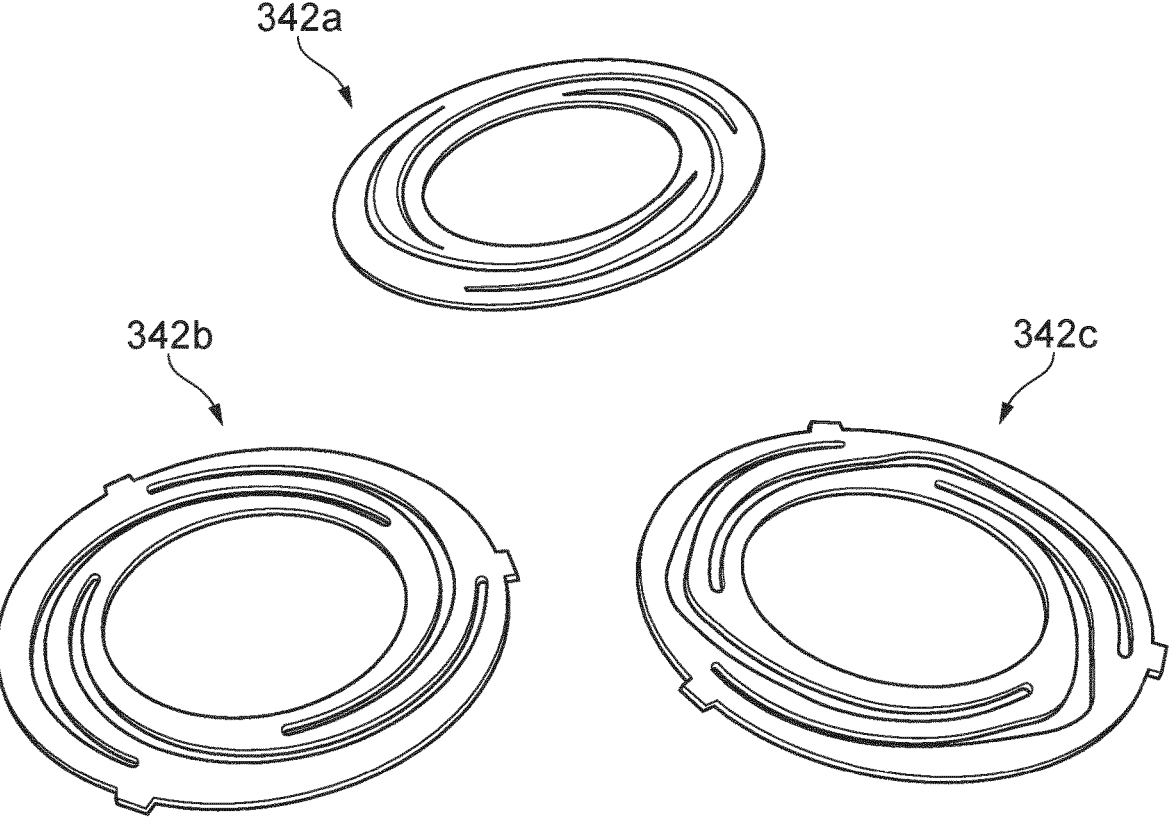
FIG. 10A shows a range of exemplary metal suspensions.
Figure 10B:
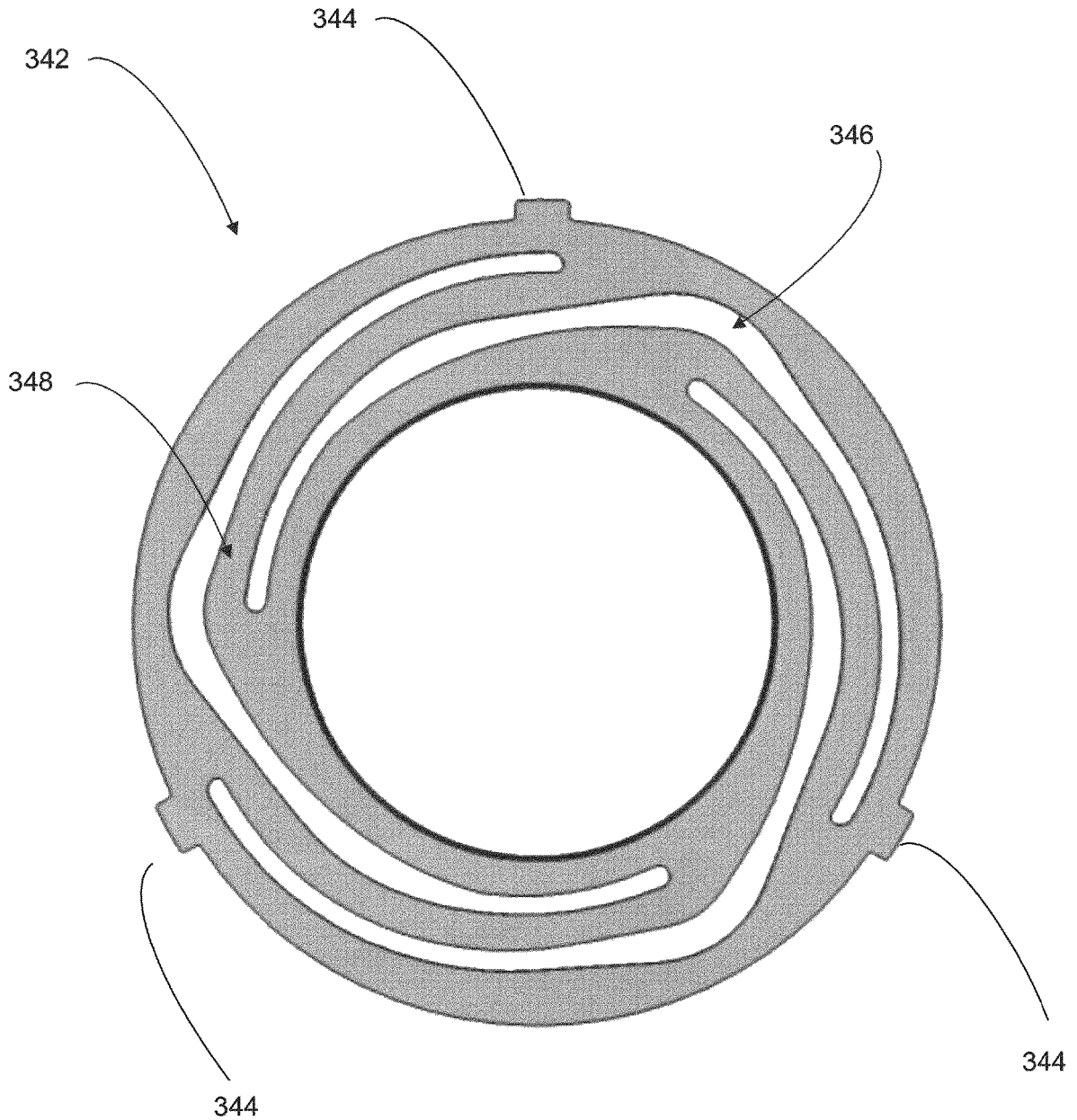
FIG. 10B shows an exemplary metal suspension.

FIGS. 10A and 10B illustrate different configurations of a metal suspension 342a, 342b, 342c which may form a distal suspension in a shaker. The metal suspension 342a, 342b, 342c may be formed from steel, such as tempered stainless steel, for example AISI 301. The metal suspension 342 illustrated has a flat (i.e. sheet-like) configuration and may include cutouts 346, although other configurations are also possible according to the material used. The flat shape of the metal suspension 342a, 342b, 342c may aid attachment (e.g. gluing) to a magnet unit of a shaker. The cutouts 346 are configurable to control the mechanical performance (e.g. strength, stiffness, fatigue resistance) of the metal suspension 342a, 342b, 342c. Metal suspensions 342b, 342c include attachment tabs 344 for attachment to a frame of a shaker, for example via a bayonet fitting as described above.

The metal suspension 342a, 342b, 342c may be formed by, for example, cutting from a sheet of metal such as stainless steel. A suitable thickness of the metal sheet may be, for example, 0.5 mm. This can provide a resonant frequency, $F_s$, of ~50 Hz for a moving mass Mm of ~60 g. For ease of handling, it is preferable that there are no burrs or sharp edges present on the metal suspension 342a, 342b, 342c so as to avoid local stresses on the component, friction on other components of the shaker and/or injuries to a person handling the component.

The metal suspension 342a, 342b, 342c may be configured to provide a particular stiffness, $K_2$, to thereby result in a desired resonant frequency $F_s$ of a shaker. For example, the design parameters include the thickness and type of the sheet metal, the length and width of the cutouts 346, the number of cutouts 346 and the radius of the cutouts 346. The areas of metal between the cutouts may be referred to as arms 348. Longer and thinner arms tend to provide a lower overall stiffness $K_2$, as does increased radius at an end of an arm 348. A lower stiffness of the material and of the designed suspension 342a, 342b, 342c can lead to lower stresses on the arms 348 of the metal suspension 342a, 342b, 342c, and hence improved fatigue resistance. Fatigue can occur when the metal suspension 342 is vibrated, and can lead to cracks or failure of the metal suspension 342a, 342b, 342c.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

REFERENCES

A number of publications are cited above in order to more fully describe and disclose the invention and the state of the art to which the Invention pertains. Full citations for these references are provided below. The entirety of each of these references is incorporated herein.

U.S. Pat. No. 4,354,067 (Yamada)
U.S. Pat. No. 4,675,907 (Itagaki).
U.S. Pat. No. 6,377,145B1 (Kumagal)
U.S. Pat. No. 7,372,968B2 (Buos).

The invention claimed is:

1. A shaker for transmitting vibrations to an application, the shaker having:
a frame, including an application attachment surface for attaching the shaker to the application;
a magnet unit configured to provide a magnetic field in an air gap;
a coil assembly including a voice coil mounted to a voice coil former, wherein the voice coil former is attached to the frame at a voice coil former attachment surface on the frame, wherein the voice coil former is configured to position the voice coil in the air gap, when the shaker is at rest;
wherein the magnet unit is configured to move relative to the voice coil along a movement axis of the shaker when the shaker is activated by supplying electrical current to the voice coil;
wherein the magnet unit is suspended from the frame by a suspension arrangement that includes a proximal suspension which interconnects the frame and the magnet unit and a distal suspension which interconnects the frame and the magnet unit, wherein the proximal suspension is closer to the voice coil former attachment surface on the frame than the distal suspension when the shaker is at rest;
wherein one of the proximal and distal suspensions has a stiffness $K_1$, and the other of the proximal and distal suspensions has a stiffness $K_2$, wherein $K_2>K_1$, and the ratio $K_1/K_2$ is 0.4 or less; and
wherein the suspension that has the stiffness $K_2$ is a metal suspension and the suspension that has the stiffness $K_1$ is a textile suspension.

2. A shaker according to claim 1, wherein $K_1$ is in the range 0.4 N/mm to 10 N/mm.

3. A shaker according to claim 1, wherein $K_2$ is in the range 2 N/mm to 50 N/mm.

4. A shaker according to claim 1, wherein the metal suspension is formed of a sheet metal having a thickness of 1 mm or less.

5. A shaker according to claim 1, wherein the textile suspension includes corrugations.

6. A shaker according to claim 1, wherein proximal suspension has the stiffness $K_1$, and the distal suspension has the stiffness $K_2$.

7. A shaker according to claim 1, wherein the suspension that has the stiffness $K_2$ includes one or more attachment tabs on an outer periphery thereof, wherein the frame includes one or more slots, each slot corresponding to a respective attachment tab on the outer periphery of the suspension that has the stiffness $K_2$, wherein the one or more attachment tabs facilitate a mechanical attachment of the distal suspension to the frame via a bayonet fitting in which the attachment tabs engage with a respective slot in the frame.

8. A shaker according to claim 1, wherein the ratio $K_1/K_2$ is 0.25 or less.

9. A shaker according to claim 1, wherein the magnet unit includes a U-yoke, having a U shape when viewed in cross section, wherein the U-yoke has a base end corresponding to the base of the U shape, and an open end corresponding to the open end of the U shape, wherein the U-yoke is mounted in the shaker with the base end of the U-yoke further from the voice coil former attachment surface than the open end of the U-yoke.

10. A shaker according to claim 9, wherein the U-yoke includes an open end attachment surface at the open end of the U-yoke, wherein an inner periphery of the proximal suspension which interconnects the frame and the magnet unit is attached to the magnet unit at the open end attachment surface of the magnet unit, and wherein the U-yoke includes a base end attachment surface at the base end of the U-yoke, wherein an inner periphery of the distal suspension which interconnects the frame and the magnet unit is attached to the magnet unit at the base end attachment surface of the magnet unit.

11. A shaker according to claim 10, wherein the U-yoke includes a shoulder at its open end to provide the open end attachment surface, and a shoulder at its base end to provide the base end attachment surface.

12. A shaker according to claim 1, wherein the shaker is divided into a proximal side and a distal side by a mid-plane which is perpendicular to the movement axis and which passes through the voice coil when the shaker is at rest, wherein the proximal side of the shaker is on the side of the mid-plane that includes the voice coil former attachment surface, and wherein the distal side of the shaker is on the other side of the mid-plane from the distal side, wherein the proximal suspension is located on the proximal side of the shaker, and the distal suspension is located on the distal side of the shaker.

13. An apparatus including:
an application;
a shaker for transmitting vibrations to the application, the shaker having:
a frame, including an application attachment surface for attaching the shaker to the application;
a magnet unit configured to provide a magnetic field in an air gap;
a coil assembly including a voice coil mounted to a voice coil former, wherein the voice coil former is attached to the frame at a voice coil former attachment surface on the frame, wherein the voice coil former is configured to position the voice coil in the air gap, when the shaker is at rest;
wherein the magnet unit is configured to move relative to the voice coil along a movement axis of the shaker when the shaker is activated by supplying electrical current to the voice coil;

wherein the magnet unit is suspended from the frame by a suspension arrangement that includes a proximal suspension which interconnects the frame and the magnet unit and a distal suspension which interconnects the frame and the magnet unit, wherein the proximal suspension is closer to the voice coil former attachment surface on the frame than the distal suspension when the shaker is at rest;

wherein one of the proximal and distal suspensions has a stiffness $K_1$, and the other of the proximal and distal suspensions has a stiffness $K_2$, wherein $K_2 > K_1$, and the ratio $K_1/K_2$ is 0.4 or less; and wherein the suspension that has the stiffness $K_2$ is a metal suspension and the suspension that has the stiffness $K_1$ is a textile suspension;

wherein the shaker is attached to the application via the application attachment surface.

14. An apparatus according to claim 13, wherein the application is a car seat or an acoustic panel.

15. A method of forming a shaker for transmitting vibrations to an application, wherein the method includes:

attaching a voice coil former to a subframe at a voice coil former attachment surface on the subframe, wherein a voice coil mounted to the voice coil former;

attaching an open end of a U-yoke of a magnet unit to an inner periphery of a proximal suspension, wherein the magnet unit is configured to provide a magnetic field in an air gap;

attaching an outer periphery of a proximal suspension to the subframe;

attaching a main frame to the subframe to form a frame;

attaching an outer periphery of a distal suspension to the main frame; and attaching a base end of the U-yoke of the magnet unit to an inner periphery of the distal suspension;

wherein one of the proximal and distal suspensions has a stiffness $K_1$, and the other of the proximal and distal suspensions has a stiffness $K_2$, wherein $K_2 > K_1$, and the ratio $K_1/K_2$ is 0.4 or less; and wherein the suspension that has the stiffness $K_2$ is a metal suspension and the suspension that has the stiffness $K_1$ is a textile suspension.

16. The shaker of claim 1, wherein the metal suspension has a flat configuration.

17. The shaker of claim 1, wherein the textile suspension is rotationally symmetric.

18. The shaker of claim 1, wherein the textile suspension is configured to have symmetrical stiffness.

19. The shaker of claim 1, wherein the frame includes a main frame and a subframe which are attached together, wherein the main frame includes the application attachment surface.

20. The shaker of claim 19, wherein the main frame and the subframe each include at least one proximal suspension attachment surface for attaching an outer periphery of the proximal suspension thereto, wherein the outer periphery of the proximal suspension is sandwiched between the at least one proximal suspension attachment surface of the main frame and the at least one proximal suspension attachment surface of the subframe.

\* \* \* \* \*